(12) United States Patent
Okumura

(10) Patent No.: US 9,621,087 B2
(45) Date of Patent: Apr. 11, 2017

(54) STEPPING MOTOR DRIVING APPARATUS, IMAGE CARRIER ROTATION DRIVING APPARATUS AND IMAGE FORMING APPARATUS

(71) Applicant: CANON KABUSHIKI KAISHA, Tokyo (JP)

(72) Inventor: Yasuhiko Okumura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/656,894

(22) Filed: Mar. 13, 2015

(65) Prior Publication Data
US 2015/0280627 A1   Oct. 1, 2015

(30) Foreign Application Priority Data
Mar. 28, 2014 (JP) .................................. 2014-068399

(51) Int. Cl.
G03G 15/00 (2006.01)
H02P 8/00 (2006.01)
H02P 8/34 (2006.01)
H02P 8/08 (2006.01)

(52) U.S. Cl.
CPC ........... H02P 8/34 (2013.01); G03G 15/5008 (2013.01); G03G 15/757 (2013.01); G03G 15/80 (2013.01); H02P 8/08 (2013.01)

(58) Field of Classification Search
CPC ............ G03G 15/757; G03G 15/5008; G03G 2215/00075; H02P 8/34; H02P 8/08; H02P 8/30; G05B 2219/41326
USPC ................................... 399/167; 318/685, 696
See application file for complete search history.

(56) References Cited

U.S. PATENT DOCUMENTS

| 4,490,662 A | * | 12/1984 | Moribe | ................ G11B 5/5521 318/685 |
| 4,691,153 A | * | 9/1987 | Nishimura | ................ H02P 8/26 318/685 |
| 4,963,808 A | * | 10/1990 | Torisawa | ............... H02K 29/08 318/254.2 |

(Continued)

FOREIGN PATENT DOCUMENTS

| JP | 04070369 A | * | 3/1992 |
| JP | 11262286 A | * | 9/1999 |
| JP | 2009213221 A | * | 9/2009 |

*Primary Examiner* — Robert Beatty
(74) *Attorney, Agent, or Firm* — Fitzpatrick, Cella, Harper & Scinto

(57) ABSTRACT

A stepping motor driving apparatus includes a stepping motor having a rotor, a driving unit configured to drive the stepping motor, and a rotation position detection unit configured to detect a rotation angle of the rotor. A control unit calculates a magnetic pole position of the stepping motor based on a first detection result and a second detection result. The stepping motor rotates by a predetermined step in one rotation direction from an initial position and thereafter rotates by the predetermined step in the other rotation direction so that the stepping motor is in a first held state. The first detection result is detected in the first held state. The stepping motor rotates by the predetermined step in the other rotation direction from the initial position and thereafter rotates by the predetermined step in the one rotation direction so that the stepping motor is in a second held state.

11 Claims, 6 Drawing Sheets

(56) References Cited

U.S. PATENT DOCUMENTS

| | | | |
|---|---|---|---|
| 7,373,093 B2* | 5/2008 | Shinohara | G03G 15/0194 399/301 |
| 8,013,563 B2* | 9/2011 | Nakai | F16H 61/32 318/437 |
| 2003/0030405 A1* | 2/2003 | Branecky | H02P 6/205 318/701 |
| 2007/0216335 A1 | 9/2007 | Takemori et al. | |
| 2008/0197798 A1* | 8/2008 | Yamada | H02P 8/22 318/696 |
| 2008/0203961 A1* | 8/2008 | Yasuda | H02P 6/16 318/647 |
| 2013/0264983 A1 | 10/2013 | Okumura | |

\* cited by examiner

STEPPING MOTOR DRIVING APPARATUS, IMAGE CARRIER ROTATION DRIVING APPARATUS AND IMAGE FORMING APPARATUS

BACKGROUND OF THE INVENTION

Field of the Invention

The present disclosure relates to a driving apparatus and a stepping motor for controlling speed and position.

Description of the Related Art

The stepping motor rotates by sequentially switching current which flows into a coil of the motor. At this time, feedback control of a rotation speed or a rotation position is not required. The stepping motor is capable of rotating by a fixed angle, including a mechanical angle of 1.8°, 7.5° and the like in a predetermined motor structure. Therefore, it is noted that the rotation angle is guaranteed to have a predetermined accuracy. Practically, the current is switched using a general-purpose stepping motor driver IC. In particular, using the stepping motor driver IC, a pulse voltage corresponding to a rotation angle desired to advance (i.e. desired to rotate) is input in a predetermined frequency to control the rotation speed and the rotation angle. The stepping motor which is controllable in this way has an advantage that it can perform easy and reliable operation.

On the other hand, the stepping motor has some disadvantages, which are stepping-out and problems caused by step operation, for example. Stepping-out of the stepping motor is a phenomenon in which, when a load torque exceeds an output torque of the stepping motor, motor rotation is stopped, which interrupts continuous rotation of the stepping motor. Such a stepping-out phenomenon should never be present in a driving apparatus. Therefore, the current value that flows into a coil of the stepping motor is determined to obtain the output torque in which some margin is further added to a maximum load torque such that the output torque always exceeds against a conceivable load torque. However, the stepping motor is maintained, during most of its operation time, in a state in which a small load torque is applied. The current determined as above causes some extra current in the above state. As a result, power loss is increased, which is a disadvantage as compared to a case where a DC motor is used in light of power saving.

Also, as a nature of the stepping motor, it is rotated by step operation. Therefore, there are problems in that vibration, noise, torque ripple or speed unevenness becomes large. For such problems, a waveform of current flowing into a coil is brought close to a sine wave through microstep driving from a rectangular wave (i.e., two phase excitation drive) to improve a conventional stepping motor. Adapting the microstep driving indeed enables to reduce torque ripple, speed unevenness, and vibration. However, the stepping motor is still controlled by the open-loop system, and the position and speed are controlled by a step angle. That is, to adapt the microstep driving does not directly contribute to reducing power loss.

Then, as a method to make use of the advantage and reduce the disadvantage of the stepping motor, a feedback control using a sensor (for example, an encoder) which detects rotation speed and position of the stepping motor is proposed.

There are two major types of feedback control system of the stepping motor. One is a system to control motor current such that torque which can resist a load torque is generated while constantly keeping phase relation between a field magnetic flux and a motor current. The system is the same as that of a brushless motor so that it is called a brushless driving system, for example. The other is a system to control the phase angle of a field magnetic flux and a motor current while constantly keeping a magnitude of the motor current. The system is called an advanced angle control system, for example. Here, the motor current indicates the current vector in which currents of each coil of the stepping motor are combined. In both feedback systems, the phase relation between the field magnetic flux and the motor current needs to be determined. Therefore, detection of a magnetic pole position is necessitated.

The encoder mounted to a rotation shaft of the stepping motor works as rotation position detection sensor. The encoder detects a rotation angle to a certain reference position (initial position). However, there is not any positional correlation between the reference position set in the encoder and a magnetic pole position of a stepping motor rotor. As a result, the magnetic pole position cannot be detected. Therefore, it is necessary to associate the reference position of the encoder with the magnetic pole position.

Conventionally, to determine the magnetic pole position, a constant current flows into a motor coil when the stepping motor is stopped. Then, a stop position where a rotor is held in this state is detected. Thereafter, the detected magnetic pole position is associated with an angle of the encoder. The principle will be described with reference to FIG. 7. FIG. 7 is a characteristic diagram illustrating the relation between an electrical angle and torque in the stepping motor. The characteristic diagram shown in FIG. 7 indicates that a rotor rotates with respect to a stabilizing point at which torque is 0 Nm. That is, FIG. 7 shows that torque is generated in a sine wave form in accordance with a change of a magnetic pole position. As shown in FIG. 7, the stepping motor generates the maximum torque when the electrical angle is ±90°. The torque value is represented by an expression (1) as:

$$T = Kt * I * \sin q \quad (1);$$

where T represents torque, Kt represents torque constant, I represents current value, and q represent electrical angle.

The conventional method assumes that there is no-load or negligibly small load. This causes a contradiction in that, if torque is generated in the stepping motor when it is stopped, the rotor rotates. Therefore, assuming that the magnetic pole is positioned at the electrical angle of 0° when the stepping motor is stopped and associating a position detected by the encoder with the magnetic pole position, the magnetic pole position was determined.

In an actual stepping motor driving apparatus, however, load torque by a static frictional force caused by a last rotation driving sometimes remains. The stepping motor is stopped with the load torque being balanced with the torque generated by the stepping motor. As a result, in the conventional technology, affected by the load torque, an initial magnetic pole position may incorrectly be detected. For example, as shown in FIG. 7, the generated torque is balanced with the electrical angle of θ1 when the load torque is T1. If the magnetic pole is associated with the electrical angle of 0° in this state, an angular error of θ1 will be caused.

In view of reducing the occurrence of such errors, a stepping motor driving device, disclosed in US2007/216335A1, is proposed. FIG. 8 is a characteristic diagram illustrating relation between an electrical angle and torque in a stepping motor of the stepping motor driving device disclosed in US2007/216335A1. In FIG. 8, T2 and q2 respectively represents torque and an electrical angle which balance with static frictional force when the stepping motor is stopped in a certain fixed current I. The detection value detected by the encoder in this state is stored as x1. Then, a fixed current which flows into a coil of the stepping motor is changed to a*1 (a≠0). As shown by a chain line in FIG. 8, the torque characteristic at this state is represented by a sine wave in which amplitude is multiplied by a.

Also, if, in that case, the generation torque T2 remains unchanged, the electrical angle is θ3. The detection value detected by the encoder in this state is stored as x2.

Above matters are organized with following expressions.

$$T2=Kt*I*\sin\theta2 \quad (2)$$

$$T2=Kt*a*I*\sin\theta3 \quad (3)$$

$$\theta2-\theta3=x1-x2=\delta \quad (4)$$

The expressions (2), (3), and (4) are solved for θ2. Then, the following is obtained.

$$\theta2 = \arctan(a*\sin\theta/(1-a*\cos\delta)) \quad (5)$$

As a result, correction amount of the magnetic pole position based on the detection value x1 can be obtained by the expression (5). A principal point of the proposal is that the encoder is not capable of measuring the absolute value of the electrical angles θ2 and θ3 but is capable of measuring the difference and θ2 can be obtained by calculation.

In the stepping motor driving device as disclosed in US2007/216335A1, a deviation of the magnetic pole position caused by the static frictional force is corrected on an assumption that the remaining load torque T2 is constant. On the other hand, the actual static frictional force generates load torque which balances with the generated torque of the stepping motor until the actual static frictional force exceeds the maximum static frictional force against a change in an external force. That is, there exists some dead zone in which the rotor does not rotate even when the generated torque is changed. As a result, the stepping motor driving device as disclosed in US2007/216335A1 cannot determine (detect) the magnetic pole position with high accuracy, which is a problem.

The present disclosure is to provide a stepping motor driving apparatus which can determine the magnetic pole position with high accuracy even in a case where load torque is generated in a stepping motor when its rotation is stopped.

SUMMARY OF THE INVENTION

According to an aspect of the present disclosure, the stepping motor driving apparatus of the present disclosure comprises a stepping motor; a driving unit configured to drive the stepping motor; a rotation position detection unit configured to detect a rotation angle of a rotor of the stepping motor; and a calculation unit configured to output signal to control the driving unit and configured to calculate a magnetic pole position of the stepping motor based on a detection value detected by the rotation position detection unit. In the stepping motor driving apparatus, the calculation unit is configured to calculate the magnetic pole position based on the first detection value and the second detection value, wherein the first detection value is a detection value detected by the rotation position detection unit with the stepping motor being held after it is rotated in one rotation direction, and wherein the second detection value is a detection value detected by the rotation position detection unit with the stepping motor being held after it is rotated in the other rotation direction.

Further features of the present invention will become apparent from the following description of exemplary embodiments (with reference to the attached drawings).

DESCRIPTION OF THE EMBODIMENTS

Description will be given for an image forming apparatus of an electrophotographic process to which the stepping motor driving apparatus according to the present disclosure is applied, with reference to the drawings.

[First Embodiment]

Figure 1:
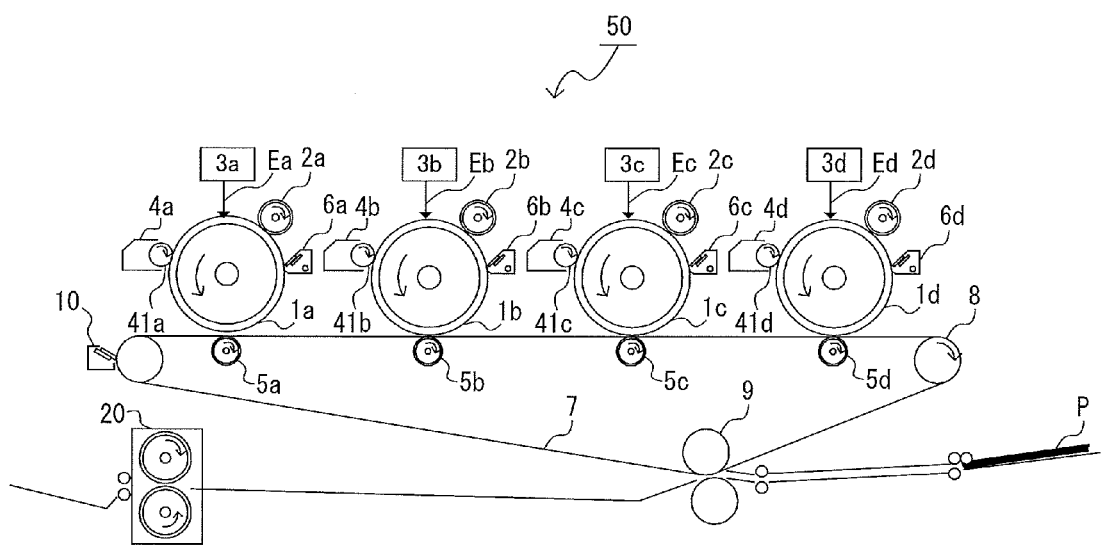
FIG. 1 is a schematic configuration diagram of an image forming apparatus to which a stepping motor driving apparatus is applied.

FIG. 1 is a schematic configuration diagram of an image forming apparatus according to the present embodiment. The image forming apparatus 50 shown in FIG. 1 has four image forming stations which are to form yellow, magenta, cyan, and black images. In FIG. 1, alphabets a, b, c, and d at the ends of reference numerals respectively represent colors of yellow, magenta, cyan, and black. The alphabets a, b, c, and d are omitted in the following description in a case where all the four colors are referred to in the description. The image forming apparatus includes a photosensitive drum 1, which is an image carrier, a charging roller 2, an exposing device 3, a developing device 4, a developing sleeve 41 in the developing device, a primary transfer roller 5, a photosensitive cleaner 6, an intermediate transfer belt 7, and an intermediate transfer belt driving roller 8. The image forming apparatus 50 also includes a secondary transfer roller 9, an intermediate transfer belt cleaner 10, and a fixing roller 20. The exposing device 3 outputs laser light E for exposure. Also, a recording member P is a recording member such as a sheet. Description will be given with regard to an overview of an image forming process.

Each component included in the image forming apparatus 50 is totally controlled by a central processing unit (CPU) (not shown). When an instruction to form an image on the recording member P is received, the image forming apparatus 50 starts to rotate the photosensitive drum 1, the intermediate transfer belt 7, the charging roller 2, the developing sleeve 41, the primary transfer roller 5, the secondary transfer roller 9 and the fixing roller 20. The charging roller is electrically connected to a high voltage power source (not shown), to which, a high voltage, where a sine wave voltage is superposed on a DC voltage, is applied. This causes the surface of the photosensitive drum 1, contacting with the charging roller 2, to be charged with a potential which is the same as that of the charging roller.

Then, laser is irradiated to the surface of the charged photosensitive drum 1 at a laser irradiation position of the exposing device 3 to expose the surface in accordance with an image signal. Thereby an electrostatic latent image is formed on the surface of the photosensitive drum 1. The developing device 4 is electrically connected to a high voltage power source (not shown). The developing device 4 applies a high voltage, where an AC voltage is superposed on a DC voltage, to the developing sleeve 41. This causes toner to be developed in the latent images on the developing sleeve 41. Thereafter, four toner images developed on the surface of the photosensitive drum 1 are superposed and transferred onto the intermediate transfer belt 7 (primary transfer) by the primary transfer roller 5.

After the primary transfer, the toner images transferred onto the intermediate transfer belt 7 are further transferred onto the recording member P by the secondary transfer roller 9. Note that a DC high voltage is also applied to the first transfer roller 5 and the second transfer roller 9 to transfer the toner images through the high voltage power source (not shown). The transfer residual toner remaining on the photosensitive drum 1 is removed and collected by the photosensitive cleaner 6. Also, the transfer residual toner remaining on the intermediate transfer belt 7 is removed and collected by the intermediate transfer belt cleaner 10. The fixing roller 20 pressurizes and heats the toner images transferred onto the recording member P to fix the toner images on the recording member P. Through the above mentioned processing, a color image is obtained.

Figure 2:
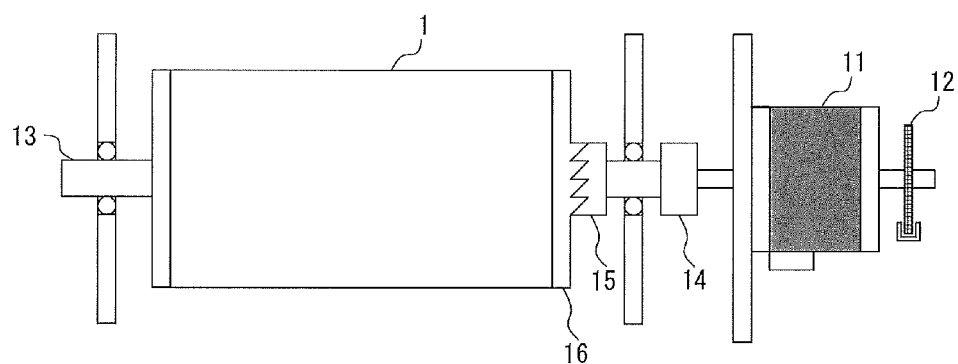
FIG. 2 is a configuration diagram illustrating configuration of driving a photosensitive drum shown in FIG. 1.

FIG. 2 is a diagram illustrating an example of a stepping motor driving apparatus which rotates and drives the photosensitive drum 1. Note that the stepping motor driving apparatus in the following description is a driving mechanism for rotating and driving the photosensitive drum 1 included in the image forming apparatus 50. The driving mechanism of the photosensitive drum 1 shown in FIG. 2 includes a stepping motor 11, an encoder 12, a drum shaft 13, couplings 14 and 15, and a drum flange 16. The stepping motor 11 is, for example, a two-phase stepping motor with a step angle of 1.8[°]. The rotation shaft of the stepping motor 11 is connected to the drum shaft which supports the photosensitive drum 1 via the coupling 14. A rotating force is transmitted to the drum shaft 13 via the coupling 14. The rotating force is also transmitted to the photosensitive drum 1 via the coupling 15 and the drum flange 16 which are connected. The encoder 12, which outputs a pulse signal indicating a rotation angle of the stepping motor 11, is mounted on the rotation shaft of the stepping motor 11.

As in the driving mechanism shown in FIG. 2, by directly connecting the photosensitive drum 1 without using a reduction gear, the occurrence of any irregular rotation of the photosensitive drum 1, affected by machining accuracy of gear or rigidity, can be reduced. Note that the stepping motor driving apparatus in which the stepping motor 11 directly rotates and drives the photosensitive drum 1 is called an image carrier rotation driving apparatus. Further, rotation and driving of the stepping motor 11 can be controlled by the encoder 12 with high accuracy. As a result, rotation and driving of the photosensitive drum 1 can also be controlled with high accuracy.

Figure 3:
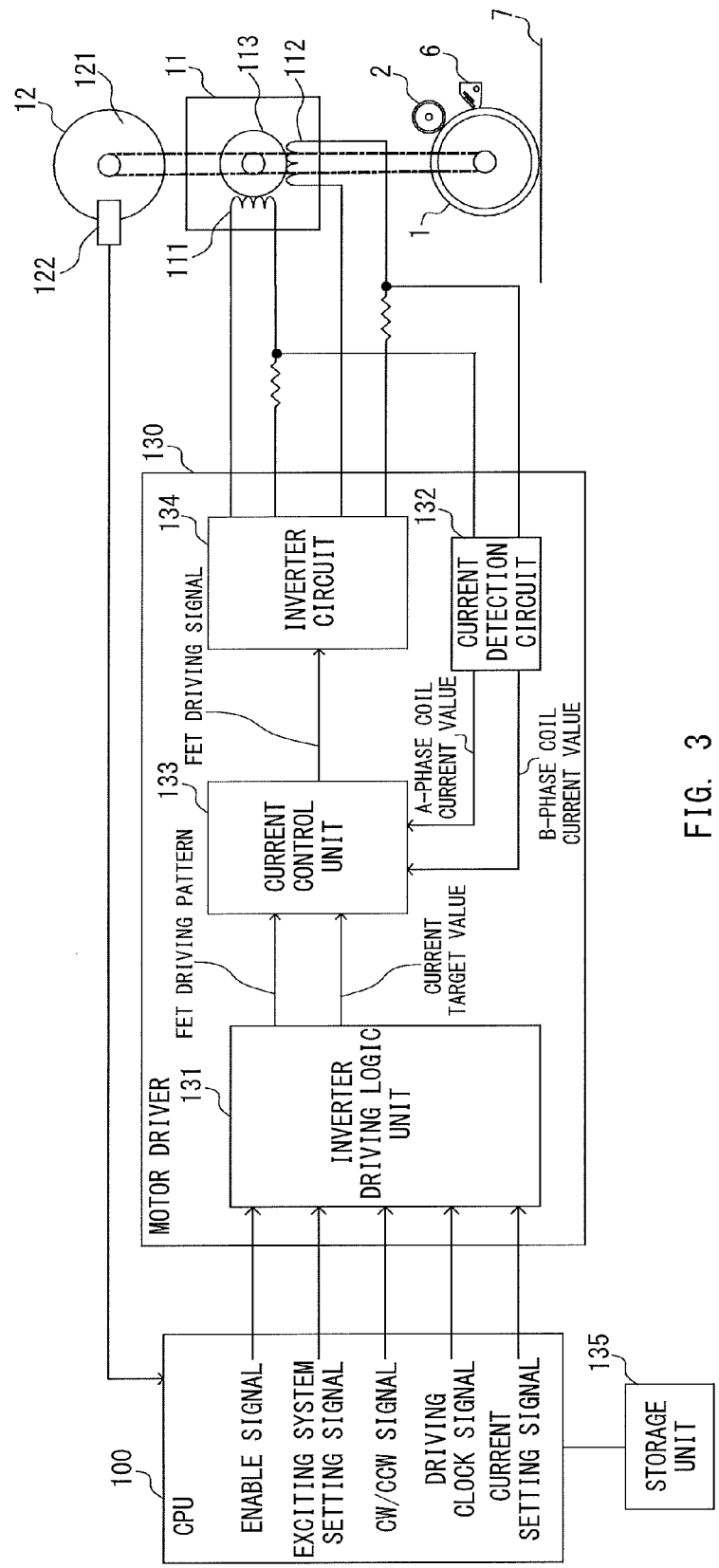
FIG. 3 is a block diagram of a control system which drives the stepping motor shown in FIG. 2.

FIG. 3 is a block diagram illustrating an example of a control mechanism of the stepping motor driving apparatus. The control mechanism shown in FIG. 3 includes a CPU 100, a motor driver 130 and a storage unit 135. The CPU 100 outputs various signals to the motor driver 130 which are required to control the stepping motor 11. The motor driver 130 includes each functional unit including an inverter driving logic unit 131, a current detection circuit 132, a current control unit 133, and an inverter circuit 134. Further, the motor driver 130 receives an enable signal, an exciting system setting signal, a CW/CCW (clockwise/counterclockwise) signal, a driving clock signal, a current setting signal and the like which are output from the CPU 100. Based on a driving sequence output from the motor driver 130, currents which are flown into coils 111 and 112 of the stepping motor 11 are switched to cause the rotor 113 to start or to stop rotation. As mentioned, the motor driver 130 works as a driving unit which drives the stepping motor 11.

The encoder 12 includes a disk 121 and a photosensor 122. Three thousand and six hundred (3600) slits are arranged on the disk 121 in a circumferential direction at equal intervals. The photosensor 122 includes a light emitting part and a light receiving part which are arranged so as to sandwich the disk 121. The encoder 12 detects light passage or light interruption to the rotating slit. Then, the encoder 12 outputs the pulse signal in response to the detection result. Further, two sensors are included in the photosensor 122, which output A-phase signal and B-phase signal. The two phases are shifted from each other by 90[°]. By counting a rising edge and a falling edge of both pulse outputs, the encoder 12 can detect the rotation angle with a resolution of 0.025[°] (=360/(3600*4)). Further, rotation direction is determined based on a detection order of the edge of each output. The rotation angle of the stepping motor 11 to the reference position (initial position) of the encoder 12 can be determined in this manner. That is, the encoder 12 works as a rotation position detection unit which detects the rotation angle of the rotor 113 of the stepping motor 11.

Note that the photosensitive drum 1 for the stepping motor 11 is a rotor having a friction load such as the charging roller 2, the photosensitive cleaner 6, the intermediate transfer belt 7 and the like.

The CPU 100 outputs each signal for driving the stepping motor 11 at any desired timing. Further, based on the output signal indicating the detection result of the encoder 12, the CPU 100 works as a calculation unit to calculate the magnetic pole position of the rotor 113. Further, the CPU 100 stores each data including the rotation angle and the like as mentioned in the storage unit 135.

The motor driver 130 rotates and drives the stepping motor 11 based on an input signal received from the CPU 100. The motor driver 130 includes a semiconductor and its peripheral circuit. Based on a condition (an instruction) indicated by the signal received from the CPU 100, the inverter driving logic unit 131 determines FET excitation sequence in the inverter circuit 134 (described later).

The enable signal is a signal to instruct whether the output from the inverter driving logic unit 131 is started or stopped or not. The enable signal controls ON/OFF of current supply to the stepping motor 11.

The exciting system setting signal is a signal to designate an excitation system or a control system. The excitation system includes, for example, the two-phase excitation, 1-2 phase excitation, W1-2 phase excitation and microstep excitation. The control system is a system in which the CPU 100 directly instructs a current target value of the respective A-phase and B-phase. In the present embodiment, description is given assuming that two-phase excitation is instructed.

The CW/CCW signal is a signal to instruct the rotation direction of the stepping motor 11. Note that in the following description, CW means clockwise, which is also described as "one rotation direction". Also, CCW means counterclockwise, which is also described as "other rotation direction".

The driving clock signal is a timing signal to perform the excitation sequence in order which is determined based on a logic instructed by other signal.

If the excitation system setting signal is either the two-phase excitation or the 1-2 phase excitation, the current setting signal directly represents the current target value. Also, if the excitation system setting signal is either the W1-2 phase excitation or the microstep excitation, the current setting signal represents a maximum current setting value which determines the current target value. Note that, in this case, the current target value is generated by multiplying the maximum current setting value by a constant x (0≤x≤1), the value of which is determined based on the excitation sequence, in accordance with the excitation sequence. Further, as to a control system in which the current target value of the A-phase and the B-phase is directly instructed, the current target values of the respective A-phase and the B-phase instructed by the CPU 100 is directly turn the current target values.

As mentioned, the FET driving pattern and the current target value are output from the inverter driving logic unit 131 based on the excitation sequence obtained in response to the instruction by five-type signals which are output from the CPU 100.

Based on the voltage generated in a sensing register, the current detection circuit 132 detects the respective coil currents of the coils 111 and 112 of the stepping motor 11.

Based on the current target value which is input by the inverter driving logic unit 131 and the coil current value which is input by the current detection circuit 132, the current control unit 133 performs pulse width modulation (PWM) such that the coils 111 and 112 obtain their respective target current values. Also, based on the FET driving pattern which is input by the inverter driving logic unit 131, the current control unit 133 outputs FET driving signal to which PWM control is performed to a predetermined FET of the inverter circuit 134.

The inverter circuit 134 forms a full-bridge type inverter circuit using FET to the respective coils 111 and 112. Each FET is driven by the FET driving signal which is output by the current control unit 133. That is, each FET is a driving circuit of so-called bipolar driving system.

The control mechanism configured in the above-mentioned manner enables to rotate and drive the stepping motor 11 in a desired excitation system and a current set value. As a result, a desired rotation speed and a rotation angle can be obtained in the stepping motor driving apparatus. The CPU 100 is capable of detecting the rotation angle of the rotor 113 of the stepping motor 11 based on the pulse signal which is input by the encoder 12.

Figure 4:
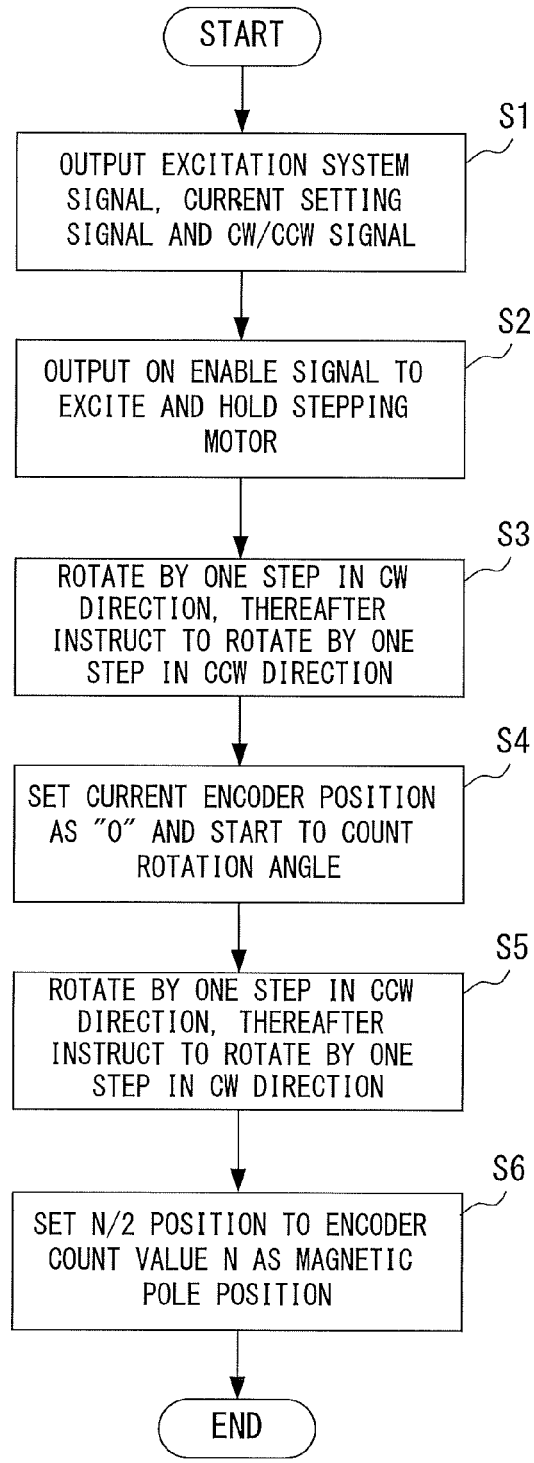
FIG. 4 is an explanatory diagram explaining control performed by a CPU in a first embodiment of the stepping motor driving apparatus.

FIG. 4 is an explanatory diagram explaining the procedure illustrating an example of a processing procedure of the stepping motor driving apparatus. Each processing explained in the following description is mainly realized by the CPU 100 by executing predetermined program and outputting various signals for controlling each function configuration.

The CPU 100 outputs an excitation system setting signal which designates a two-phase excitation system, a current setting signal which designates a predetermined current setting value, and a CW/CCW signal which designates CW direction to the motor driver 130 (S1). Then, the CPU 100 outputs ON enable signal. This causes a constant current, which is based on the setting, to flow into the coils 111 and 112 via the motor driver 130. Then, the stepping motor 11 is excited and held (S2).

The CPU 100 outputs one pulse of the driving clock signal to the motor driver 130 to rotate the stepping motor 11 by one step angle in CW direction. Next, the CPU 100 switches the CW/CCW signal to CCW direction and again outputs one pulse of the driving clock signal to the motor driver 130 to rotate the stepping motor 11 by one step angle in CCW direction (S3). Therefore, the stepping motor rotates by a predetermined step in CW direction (in this example, rotates by one step). Thereafter, the stepping motor rotates by the predetermined step in CCW direction (in this example, rotates by one step). After the rotation in CW and CCW directions by the predetermined step, the stepping motor returns to the position where it is first excited and held (initial position). The CPU 100 sets a detection value detected by the encoder 12 in this state (first detection value) as a reference position 0, which is stored in the storage unit 135. Based on the reference position 0, the encoder 12 starts to count detection pulse (S4). Note that, depending on the rotation direction, the detection pulse is counted with positive and negative signs. Also, a count number means rotation angle of 0.025[°] per one count.

Keeping the CW/CCW signal in CCW direction, the CPU 100 outputs one pulse of the driving clock signal to the motor driver 130 to rotate the stepping motor 11 by one step angle. Next, switching the CW/CCW signal to CW direction, the CPU 100 again outputs one pulse of the driving clock signal to the motor driver 130 to rotate the stepping motor 11 by one step angle (S5). This causes the stepping motor 11 to return to the position where the stepping motor 11 is excited and held in the processing of Step S2 (initial position). The encoder 12 detects a value in this state (second detection value), which corresponds to a count value N of an output pulse. The CPU defines a position which corresponds to N/2 to the count value N as a magnetic pole position of the stepping motor 11 (S6). It means that an intermediate value between the first detection value and the second detection value is defined as the magnetic pole position of the stepping motor.

Figure 5:
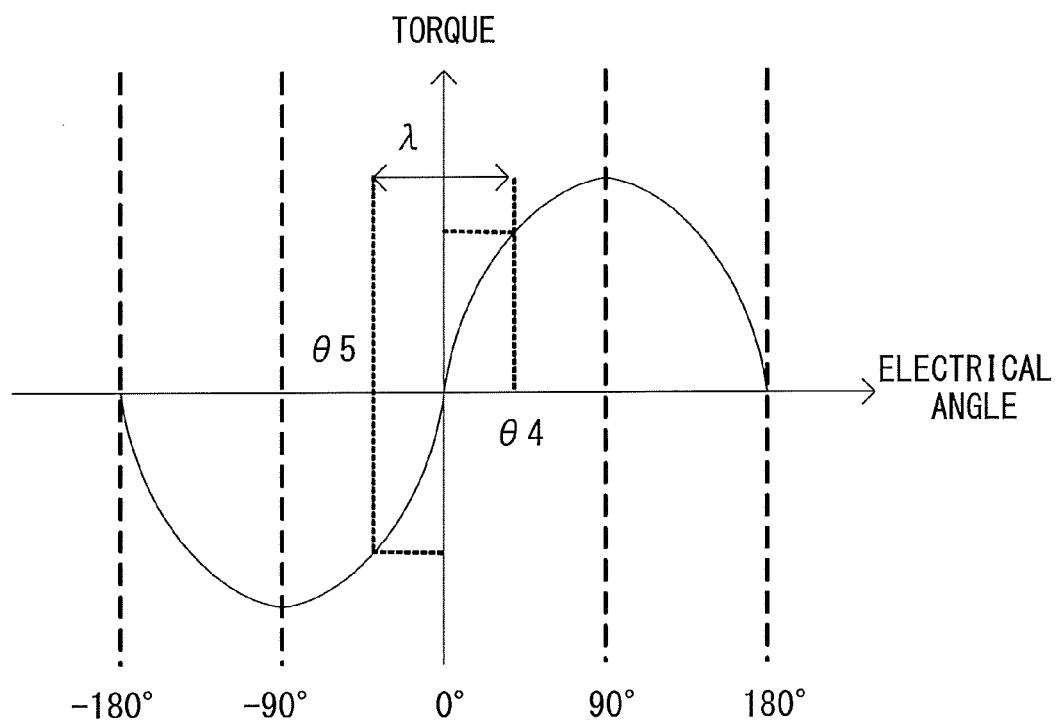
FIG. 5 is a characteristic diagram representing an electrical angle and torque of the stepping motor in the first embodiment of the stepping motor driving apparatus.

FIG. 5 is a characteristic diagram illustrating the relation between an electrical angle and torque of a stepping motor 11 in the stepping motor driving apparatus. As previously mentioned, in an ideal load where no static frictional force exists, it can be considered that the magnetic pole position of the stepping motor 11 is a position where the electrical angle is 0[°] when the stepping motor is excited and held to be in a stop state. However, in a load state where some static frictional force exists, it is not possible to determine how much electrical angle exists to balance with the static frictional force to stop the stepping motor. Therefore, in a state where rotation driving of the stepping motor 11 is advanced by one step and thereafter returned by one step, that is, in a state after processing of Step S3 shown in FIG. 4, the static frictional force acts in CW direction to the rotation direction CCW. It means that torque is balanced with the static frictional force at a position where electrical angle is θ4 shown in FIG. 5. The position is set as a reference position of the encoder 12 (initial position), where count value is set 0.

Then, in a state after processing of Step S5 shown in FIG. 4, the static frictional force acts in CCW direction to the rotation direction CW. It means that torque deems to be balanced with the static frictional force at a position where the electrical angle is θ5 shown in FIG. 5. The count value at this position is set as a count value N, which is stored in the storage unit 135. Note that the count value N represents detection amount which corresponds to an electrical angle λ. It means that, it is considered that electrical angle θ4 is nearly equal to the electrical angle −θ5 (θ4−θ5). Therefore, it can be determined that λ/2, that is, N/2 represents the magnetic pole position of the stepping motor 11. Therefore, the CPU 100 stores again the rotation angle counted by N/2 of the encoder 12 as count value 0 in the storage unit 135. Based on the count number of the encoder 12, the magnetic pole position is detected. Even in a state where some static frictional force exists, by processing as mentioned, it becomes possible to more accurately associate the detected magnetic pole position with the encoder 12.

As mentioned, in the stepping motor driving apparatus included in the image forming apparatus 50 of the present embodiment, the magnetic pole position of the stepping motor 11 can more accurately be detected using the encoder 12. This enables to perform feedback control more accurately using the magnetic pole position including determination of stepping-out margin, brushless driving system, and advanced angle control system.

Note that it is sufficient to once perform the processing to associate the magnetic pole position with the reference position of the encoder 12 in a state where the rotation angle of the encoder 12 is detectable. However, not limited to this, the processing may be performed more than once. Further, in some cases, the rotation of the rotor 113 cannot be detected. Such cases are, for example, when the image forming apparatus 50 is in a stop state, when the photosensor 122 is powered OFF, when the CPU 100 is powered OFF, when the CPU 100 stops counting the pulse signal of the encoder 12. In that case, when the image forming apparatus 50 is resumed from a stand by state or is powered ON so that the rotation angle of the encoder 12 becomes detectable, the above process for associating the magnetic pole position with the reference position of the encoder 12 will be performed again.

Also, in the disclosure, description was given as an example with regard to an operation to rotate the stepping motor by one step angle. For example, in a case where any dead zone exists due to a play of reduction gear included in the load, not only the operation of rotating one step angle but other operation of driving the stepping motor a few pulses and returning the pulse of the same amount thereafter is also available.

Also, to describe the present embodiment, description was given as an example in a case where the stepping motor 11 is returned to the position where the stepping motor 11 is first excited and held, setting the detection value of the encoder 12 in this state as the reference position 0, and storing the detection value in the storage unit 135. This is to simply find out the reference position when the static frictional force is applied to CW direction and the reference position when the static frictional force is applied to CCW direction. Therefore, it is not limited to the position where the stepping motor 11 is first excited and held. For example, if the position is different from the position where the stepping motor is first excited and held, what is required is to perform a calculation by subtracting the count value corresponding to the instructed step angle from the measured count value.

Also, in this embodiment, description was given as an example in a case where the count value N/2 is obtained through one time operation. Alternatively, this may be a method where operation is repeated more than once to perform average processing to smooth detection variation.

[Second Embodiment]

In the present embodiment, description will be given with regard to a processing procedure which is different from that of the stepping motor driving apparatus shown in the first embodiment. Note that the configuration of the stepping motor driving apparatus in the second embodiment is the same as that described in FIGS. 1 to 3 described in the first embodiment.

Figure 6:
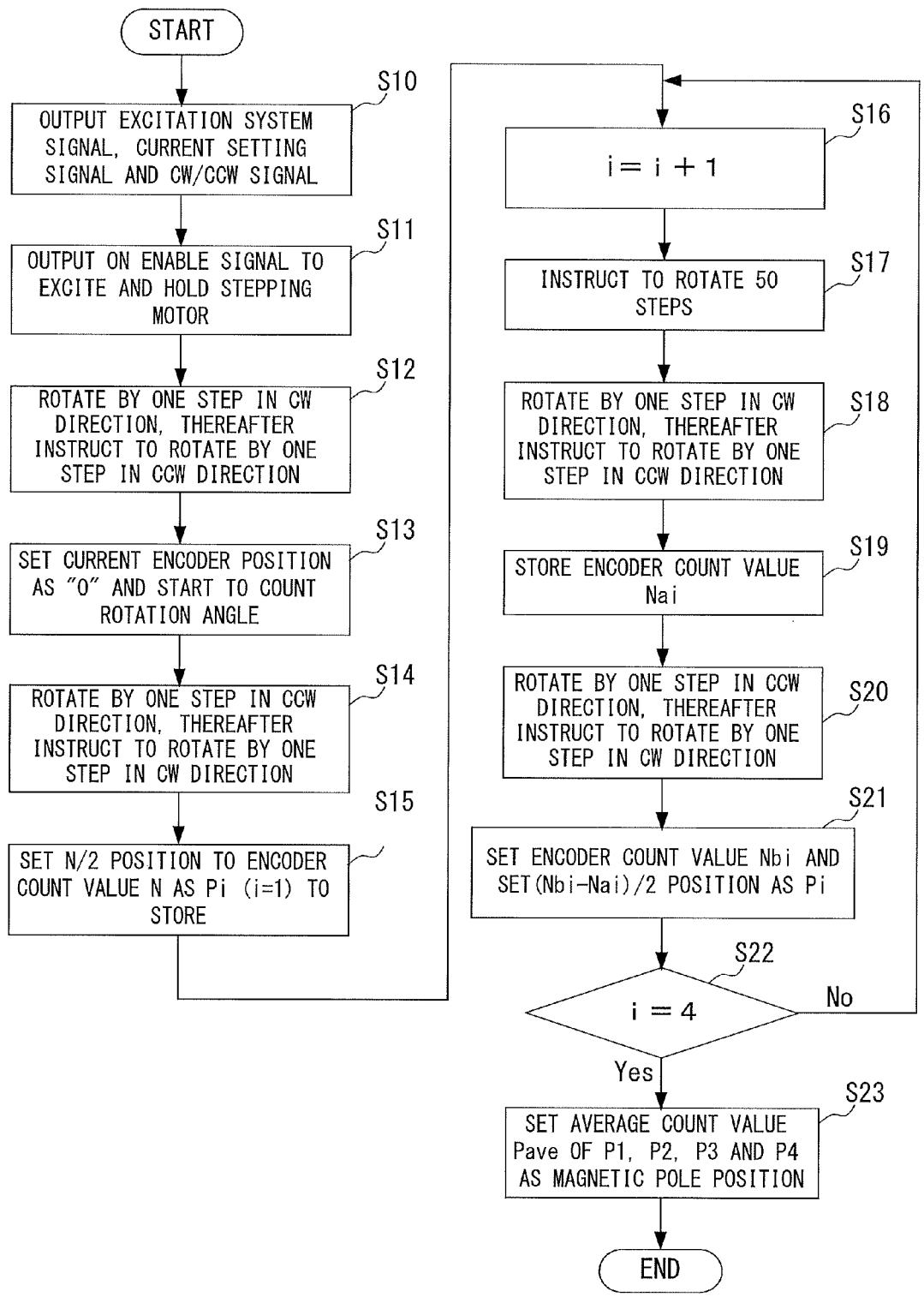
FIG. 6 is an explanatory diagram explaining control performed by the CPU in a second embodiment of the stepping motor driving apparatus.
Figure 7:
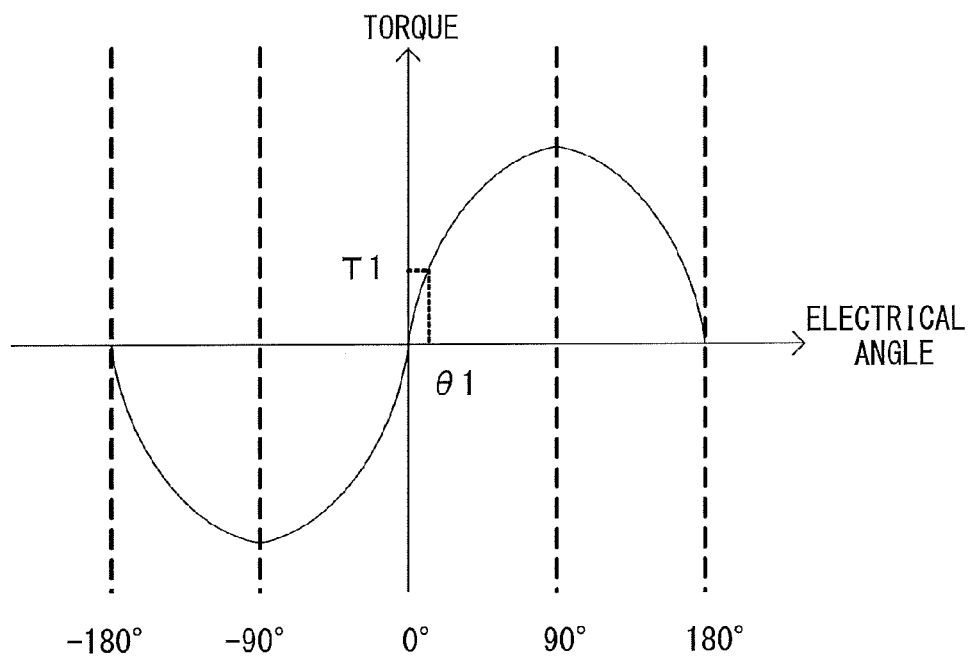
FIG. 7 is a characteristic diagram representing the relation between an electrical angle and torque of a conventional stepping motor.
Figure 8:
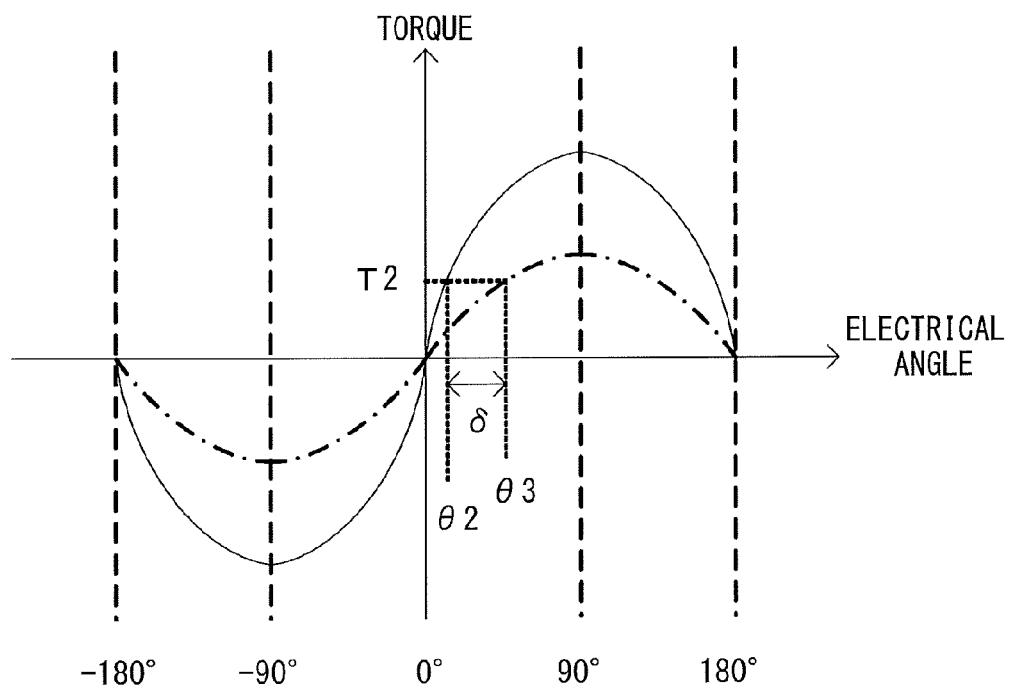
FIG. 8 is a characteristic diagram representing the relation between an electrical angle and torque of a stepping motor of prior art disclosed in US2007/216335A1.

FIG. 6 is an explanatory diagram explaining the procedure illustrating an example of a processing procedure of the stepping motor driving apparatus of the present embodiment. Each processing explained in the following description is mainly realized by CPU 100 by executing a predetermined program and outputting various signals for controlling each function configuration.

The CPU 100 outputs an excitation system setting signal which instructs a two-phase excitation system, a current setting signal which instructs a predetermined current setting value, and a CW/CCW signal which instructs CW direction to the motor driver 130 (S10). Then, the CPU 100 outputs ON enable signal. This causes a constant current, which is based on the setting, to flow into the coils 111 and 112 via the motor driver 130. Then, the stepping motor 11 is excited and held (S11).

The CPU 100 outputs one pulse of the driving clock signal to the motor driver 130 to rotate the stepping motor 11 by one step angle in CW direction. Next, the CPU 100 switches the CW/CCW signal to CCW direction and again outputs one pulse of the driving clock signal to the motor driver 130 to rotate the stepping motor 11 by one step angle in CCW direction (S12). The CPU 100 sets a detection value detected by the encoder 12 in this state (first detection value) as a reference position 0, which is stored in the storage unit 135. Based on the reference position 0, the encoder 12 starts to count detection pulse (S13). Note that, depending on the rotation direction, the detection pulse is counted with positive and negative signs. Also, a count number means a rotation angle of 0.025[°] per one count.

Keeping the CW/CCW signal in CCW direction, the CPU 100 outputs one pulse of the driving clock signal to the motor driver 130 to rotate the stepping motor 11 by one step angle. Next, switching the CW/CCW signal to CW direction, the CPU 100 again outputs one pulse of the driving clock signal to the motor driver 130 to rotate the stepping motor 11 by one step angle (S14). This causes the stepping motor 11 to return to the position where the stepping motor 11 is excited and held (initial position) in the processing of Step S11. The encoder 12 detects a value in this state (second detection value), which corresponds to a count value N of an output pulse. The CPU defines a position which corresponds to N/2 count value to the count value N as a count value Pi, which is stored in the storage unit 135 (S15).

The CPU 100 outputs 50 pulses of the driving clock signal to the motor driver 130, where i=i+1, to rotate the stepping motor 11 by a mechanical angle of 90° (S17). Then, the CPU 100 again outputs one pulse of the driving clock signal to the motor driver 130 to rotate the stepping motor 11 by one step angle in CW direction. Next, switching the CW/CCW signal to CCW direction, the CPU 100 outputs one pulse of the driving clock signal to the motor driver 130 to rotate the stepping motor 11 by one step angle in CCW direction (S18).

The CPU 100 sets the count value of the detection pulse in this state as a count value Nai, which is stored in the storage unit 135 (S19). Keeping the CW/CCW signal in CCW direction, the CPU 100 outputs one pulse of the driving clock signal to the motor driver 130 to rotate the stepping motor 11 by one step angle. Then, switching the CW/CCW signal to CW direction, the CPU 100 again outputs one pulse of the driving clock signal to the motor driver 130 to rotate the stepping motor by one step angle (S20).

The CPU 100 sets the count value of the detection pulse in this state as a count value Nbi, sets a position which corresponds to (Nbi−Nai)/2 as a count value Pi, which are stored in the storage unit 135 (S21). The CPU 100 determines whether i=4 or not (S22). If not i=4 (S22: No), processing returns to the processing of Step S16. If i=4 (S22: Yes), the CPU 100 calculates the average value of count values P1, P2, P3 and P4 as an average count value Pave. In particular, positions which are rotated by predetermined angles to the initial excitation hold position (where i=4), that is, positions at electrical angles of 0[°], 90[°], 180[°], and 270[°] from the initial excitation hold position are defined as initial positions. The Count values P1, P2, P3, and P4 are obtained for each initial position, which are stored in the storage unit 135. Based on these count values, the CPU 100 calculates the average count value Pave of P1+1080 (=50*1.8/0.25*3), P2+720 (=50*1.8/0.25*2), P3+360 (=50*1.8/0.25*1), and P4. The CPU 100 sets the position of the average count value Pave of the encoder 12 as a magnetic pole position of the stepping motor 11 (S22). Note that to calculate the average count value Pave, pulse numbers (such as 1080, 720, 360) are respectively added to the count values P1, P2, P3. Such pulse numbers are obtained by converting the amount by which the stepping motor is advanced for every 50 step into an encoder count value.

Then, the CPU 100 stores again the rotation angle counted by the average count value Pave of the encoder 12 as count value 0 in the storage unit 135. Based on the count number of the encoder 12, the magnetic pole position is detected.

As mentioned, in the stepping motor driving apparatus according to the present embodiment, the magnetic pole position of the stepping motor 11 for every rotation angle is calculated. Based on the calculation result, the averaged magnetic pole position is detected. This enables to reduce variation error in the electrical angle torque characteristic for every step angle of the stepping motor 11 when detecting the magnetic pole position. Note that the variation in the electrical angle torque characteristic in FIG. 5 showed an ideal sine wave in the characteristic. This is because, actually, some harmonic wave components are included due to a cogging torque. Also, due to manufacturing variation, there exists variation at a position where torque is 0 depending on the rotation position.

Also, to describe the present embodiment, description was given in a case where one cycle of the stepping motor is divided into four for every electrical angle of 90[°] as an example when the stepping motor 11 is divided into a plurality of predetermined angles. For example, the number of divisions can optionally be set, like dividing one circumference into eight or three. Also, any number of cycles may be divided into any number of divisions. Further, in the present embodiment, description was given as an example in a case where CW/CCW operation is performed for every rotation position of the stepping motor 11 to obtain the count value Pi. Alternatively, while rotating the stepping motor by 360[°] in CW direction, count values at the electrical angles of 0 [°], 90[°], 180[°], and 270[°] are stored in the storage unit 135. Next, while rotating the stepping motor by 360[°] in CCW direction, the count values at the electrical angle of θ[°], 90[°], 180[°], and 270[°] are stored in the storage unit 135. In this case, the CPU 100 obtains the count value Pi based on the detection result of the encoder 12 (each count value) stored in the storage unit 135.

The present invention has been described in detail by way of the above-mentioned embodiments, but the scope of the present invention is not limited to those embodiments. Also, according to the present disclosure, even in a case where load torque is generated in the stepping motor when its rotation is stopped, it is possible to determine the magnetic pole position of the stepping motor with high accuracy.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068399, filed Mar. 28, 2014, which is hereby incorporated by reference in its entirety.

What is claimed is:

1. A stepping motor driving apparatus, comprising:
   a stepping motor having a rotor;
   a driving unit configured to drive the stepping motor;
   a rotation position detection unit configured to detect a rotation angle of the rotor of the stepping motor; and
   a control unit configured to output a signal to control the driving unit and configured to calculate a magnetic pole position of the stepping motor based on a detection result detected by the rotation position detection unit,
   wherein the control unit is configured to calculate the magnetic pole position based on a first detection result and a second detection result,
   wherein the control unit causes the stepping motor to rotate by a predetermined step in one rotation direction from an initial position and thereafter the control unit causes the stepping motor to rotate by the predetermined step in an opposite rotation direction so that the stepping motor is in a first held state,
   the first detection result is detected by the rotation position detection unit in the first held state, and
   wherein the control unit causes the stepping motor to rotate by the predetermined step in the opposite rotation direction in the first held state and thereafter the control unit causes the stepping motor to rotate by the predetermined step in the one rotation direction so that the stepping motor is in a second held state, and the second detection result is detected by the rotation position detection unit in the second held state.

2. The stepping motor driving apparatus according to claim 1, wherein:
   the stepping motor has a plurality of initial positions including a first initial position, a second initial position, . and an Nth initial position (N=2, 3, .);
   the first and second detection results are detected for each initial position, and
   the control unit calculates the magnetic pole position based on the first and second detection results corresponding to the plurality of initial positions.

3. The stepping motor driving apparatus according to claim 2, wherein the plurality of initial positions are 0°, 90°, 180°, and 270°.

4. The stepping motor driving apparatus according to claim 1, further comprising:
   a storage unit configured to store the first detection result and the second detection result,
   wherein the control unit is configured to calculate the magnetic pole position based on the first detection result and the second detection result stored in the storage unit.

5. The stepping motor driving apparatus according to claim 1,
wherein the control unit sets an intermediate value between the first detection result and the second detection result as the magnetic pole position of the stepping motor.

6. The stepping motor driving apparatus according to claim 1, further including:
a storage unit configured to store a detection result of the rotation position detection unit,
wherein the control unit is configured to calculate a magnetic position of the stepping motor based on the first detection result and the second detection result stored in the storage unit.

7. An image carrier rotation driving apparatus comprising:
an image carrier; and
a stepping motor driving apparatus according to claim 1,
wherein the stepping motor directly rotates and drives the image carrier.

8. An image forming apparatus comprising:
an image carrier; and
the stepping motor driving apparatus according to claim 1, wherein the stepping motor is a driving apparatus of the image carrier.

9. The image forming apparatus according to claim 8, comprising:
a plurality of the image carriers,
wherein each of the image carriers is driven by a corresponding stepping motor driving apparatus.

10. The image forming apparatus according to claim 9, further comprising:
four image forming stations to form yellow, magenta, cyan, and black images,
wherein, in each image forming station, an image carrier driven by the stepping motor driving apparatus is respectively provided.

11. The stepping motor driving apparatus according to claim 1, wherein
the control unit defines a midpoint position between one position corresponding to the first detection result and another position corresponding to the second detection result, as the magnetic pole position.

* * * * *